United States Patent
Chen et al.

(10) Patent No.: US 10,789,235 B2
(45) Date of Patent: Sep. 29, 2020

(54) BASE USER DEFINED FUNCTIONS

(71) Applicant: ENTIT Software LLC, Sunnyvale, CA (US)

(72) Inventors: Qiming Chen, Sunnyvale, CA (US); Meichun Hsu, Sunnyvale, CA (US); Rui Liu, Sunnyvale, CA (US); Maria Guadalupe Castellanos, Sunnyvale, CA (US)

(73) Assignee: MICRO FOCUS LLC, Santa Clara, CA (US)

( * ) Notice: Subject to any disclaimer, the term of this patent is extended or adjusted under 35 U.S.C. 154(b) by 462 days.

(21) Appl. No.: 15/555,634

(22) PCT Filed: Mar. 20, 2015

(86) PCT No.: PCT/US2015/021856
§ 371 (c)(1),
(2) Date: Sep. 5, 2017

(87) PCT Pub. No.: WO2016/153469
PCT Pub. Date: Sep. 29, 2016

(65) Prior Publication Data
US 2018/0046659 A1 Feb. 15, 2018

(51) Int. Cl.
*G06F 16/30* (2019.01)
*G06F 16/22* (2019.01)
*G06F 16/245* (2019.01)

(52) U.S. Cl.
CPC ........ *G06F 16/2291* (2019.01); *G06F 16/245* (2019.01)

(58) Field of Classification Search
CPC ................... G06F 16/24568; G06F 16/24554
(Continued)

(56) References Cited

U.S. PATENT DOCUMENTS 8,112,408 B2 * 2/2012 Chen .................. B60Q 9/00
707/706
8,639,717 B2 1/2014 Fish et al.
(Continued)

FOREIGN PATENT DOCUMENTS

WO WO2015039072 A1 3/2015

OTHER PUBLICATIONS

HP; "New Features Guide, HP Vertica Analytics Platform", Software Version: 7.0.x; Release Date: Dec. 18, 2013; 41 pp.
(Continued)

*Primary Examiner* — Sana A Al-Hashemi

(57) ABSTRACT

Methods, devices, and techniques for base user defined functions in a database management system are discussed herein. For example, in one aspect, a query request is received from a computer device. The query request may include a query operator representing a specialized user defined function (SUDF). The SUDF may then be executed. Executing the SUDF may include executing a base operation of a base user defined function (BUDF). The base operation may interact with an application programming interface (API) of the query engine to obtain a tuple stored in the database. Executing the SUDF may further include executing a specialized operation that processes the tuple according to an analytics function. The specialized operation may generate a result. Then, a query result may be returned to the computer device. The query result can include the result.

18 Claims, 4 Drawing Sheets

(58) Field of Classification Search
USPC ........ 707/609, 687, 705, 769, 790, 813, 821
See application file for complete search history.

(56) References Cited

U.S. PATENT DOCUMENTS

| | | | |
|---|---|---|---|
| 2008/0162396 A1* | 7/2008 | Kerley | G06N 5/025 |
| | | | 706/47 |
| 2008/0270392 A1 | 10/2008 | Day et al. | |
| 2009/0043910 A1 | 2/2009 | Barsness et al. | |
| 2009/0112799 A1 | 4/2009 | Barsness et al. | |
| 2010/0121863 A1* | 5/2010 | Reed | G06F 16/2453 |
| | | | 707/758 |
| 2010/0174678 A1* | 7/2010 | Massand | G06F 40/194 |
| | | | 707/610 |
| 2011/0029551 A1* | 2/2011 | Chen | G01D 11/28 |
| | | | 707/759 |
| 2012/0191732 A1 | 7/2012 | George | |
| 2013/0254238 A1 | 9/2013 | Yan et al. | |
| 2014/0351233 A1* | 11/2014 | Crupi | G06F 16/24568 |
| | | | 707/706 |

OTHER PUBLICATIONS

Chen, Q. et al., "Extend UDF Technology for Integrated Analytics," Springer Berlin Heidelberg, 2009, 3 ppages, available at http://link.springer.com/chapter/10.1007%2F978-3-642.

International Searching Authority., International Search Report and Written Opinion dated Apr. 22, 2016 for PCT Application No. PCT/Us2015/021856 Filed Mar. 20, 2015, 14 pgs.

* cited by examiner

BASE USER DEFINED FUNCTIONS

BACKGROUND

A database management system (DBMS) is a system that manages databases and is capable of storing and retrieving large volumes of data. A Large scale DBMS can be implemented to support thousands of users accessing the databases via a wide assortment of applications. A DBMS can be structured to support a variety of different types of operations for a requesting entity (e.g., an application, the operating system or an end user). Such operations can be configured to retrieve, add, modify and delete data being stored and managed by the DBMS. Database access methods can support these operations using high-level query languages, such as the Structured Query Language (SQL). One of the primary operations performed with SQL is querying (also referred to herein as retrieving or selecting) data from data structures within a database.

DETAILED DESCRIPTION

Examples discussed herein may be applied to user defined functions (UDFs). A UDF may provide a mechanism for extending functionality of a database server by adding a function that can be evaluated in a query. A UDF that can be used as a relational operator in a SQL query is one way to add analytics functions to SQL queries. UDFs can also be used as a data source function for retrieving data from external systems. However, developing a UDF by directly interfacing with the APIs of a DBMS can be cumbersome and hard to maintain. As a result, wrapping each operator individually into a UDF can be tedious and may not be scalable when there is a large library of functions to be wrapped.

Examples discussed herein may address some of these issues by using a base UDF (BUDF) approach. A BUDF may be a base class definition (e.g., a Java class, C++, or any other suitable coding language) that encapsulates query engine interactions used by a UDF. Query engine interactions that may be encapsulated by the BUDF may include interactions for obtaining a host name, writing tuples, resolving a role, resolving a resource, and other suitable query engine interactions. Further, the BUDF may also specify various methods to be overridden by subclasses that specialize the BUDF. Such methods may define a developer supplied function (e.g., an analytics function) that operates on one or more tuples stored in the database. Accordingly, in some examples discussed herein, a developer may define a specialized user defined function (SUDF) that specializes the BUDF and overrides an operation (e.g., a pure virtual operation) defined by the BUDF. The overridden operation may include the user specific operation details, while the BUDF may hide the read/write interfaces of the database management system.

In one aspect discussed in the foregoing, a query request is received from a computer device. The query request may include a query operator representing a specialized user defined function (SUDF). The SUDF may then be executed. Executing the SUDF may include executing a base operation of a base user defined function (BUDF). The base operation may interact with an application programming interface (API) of the query engine to obtain a tuple stored in the database. Executing the SUDF may further include executing a specialized operation that processes the tuple according to an analytics function. The specialized operation may generate a result. Then, a query result may be returned to the computer device. The query result can include the result.

Figure 1:
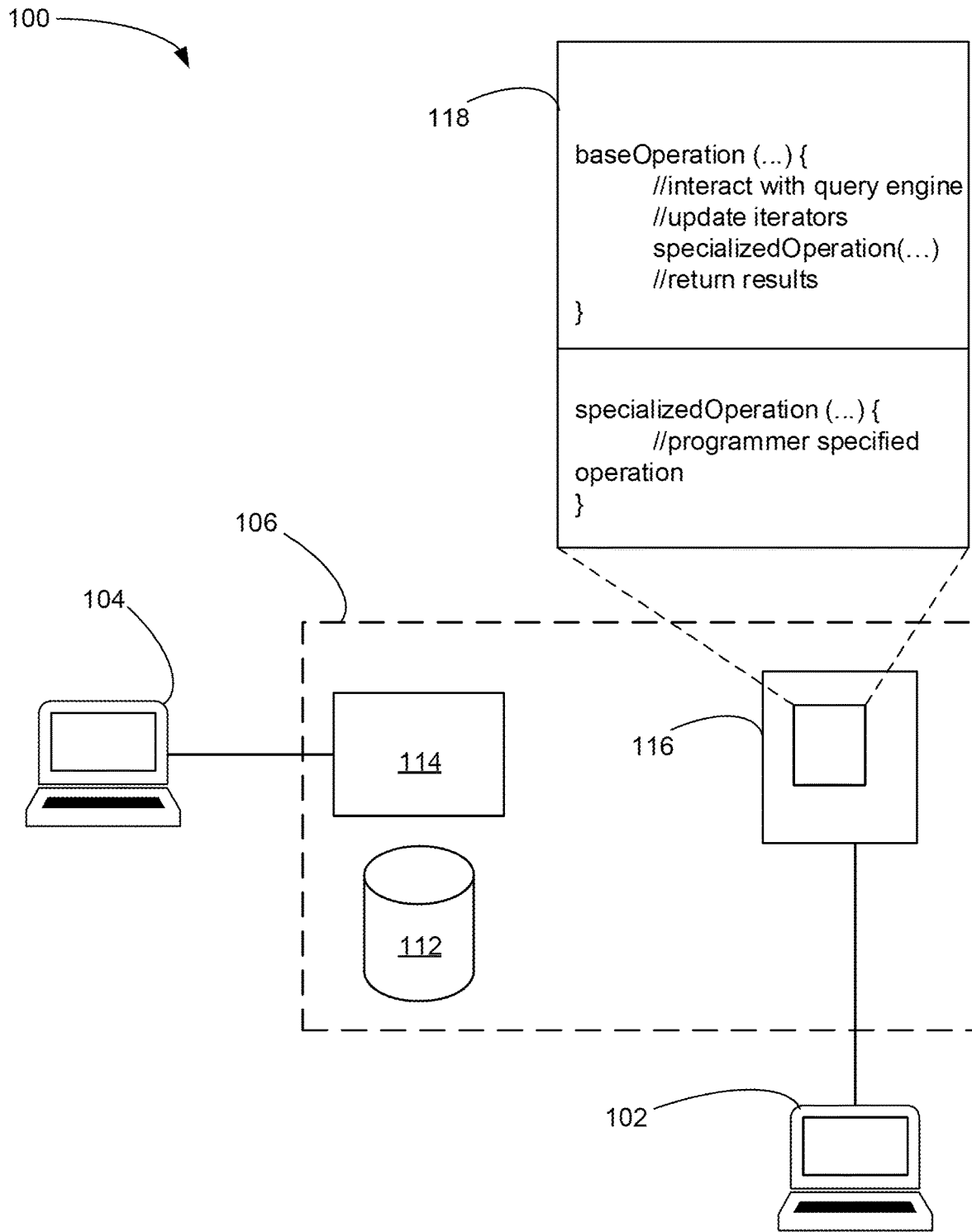
FIG. 1 is a diagram illustrating a system utilizing a base user defined function approach, according to an example.

The figures are now discussed in greater detail. FIG. 1 is a diagram illustrating a system 100 utilizing a BUDF approach, according to an example. For example, the system 100 may include a UDF input machine 102, a querying machine 104, and a BUDF enabled database management system 106. The UDF input machine 102, the querying machine 104, and the BUDF enabled database management system 106 may be communicatively coupled through, for example, a network.

The UDF input machine 102 may be a computer system (e.g., one or more computer devices, such as desktops, laptops, networking devices, tablets, mobile phones, set-top boxes, and the like) that is configured to send, transmit, update, or delete user defined functions stored in the BUDF enabled database management system 106. In some cases, the UDF input machine 102 may be used by a database administrator or developer (not shown in FIG. 1) to define a UDF that specializes a BUDF. A UDF that specializes a BUDF may be referred to as a specializing UDF (SUDF). A UDF can specialize the BUDF through the use of facilities offered through programming languages such as C++, JAVA, C#, or any other suitable object oriented programming language.

The querying machine 104 may be a computer system (e.g., one or more computer devices, such as desktops, laptops, network devices, tablets, mobile phones, set-top boxes, and the like) that is configured to send query requests to the BUDF enabled database management system 106. The query requests may include data representing data expressed by a determinable syntax, such as structured query language (SQL), which may, in turn, include a reference to a SUDF.

The BUDF enabled database management system 106 is a computer system (e.g., one or more computer devices, such as desktops, laptops, network devices, tablets, mobile phones, set-top boxes, and the like) that is configured to receive UDFs from the UDF input machine 102, receive query requests from the querying machine 104, and execute the query requests according to the UDFs. In accordance with some examples, the BUDF enabled database management system 106 may include a database 112, a query engine 114, and a UDF manager 116. The database 112 may be a computer system configured to store searchable and identifiable data. In some cases, the data may be organized as tables and can be searchable using indexes.

The query engine 114 may be a module executed by a computer system for receiving and processing a query requests. In processing a query requests, the query engine 114 may parse the query requests to identify operators, operations, and UDFs expressed therein and coordinate execution of these operators, operations, and UDFs on the database to produce a query response.

The UDF manager 116 may be a module executed by a computer system for receiving UDFs from the UDF input device 102 and loading the UDFs, or otherwise making them accessible, to the query engine 114. FIG. 1 shows that the UDF manager 116 may store a SUDF 118. A SUDF may be a UDF that specializes a BUDF. Specialization may be achieved, in some cases, based on inheritance, as may be provided by a programming language, such as C++ or JAVA. The BUDF may include a base operation that interacts with the query engine and/or advances read/write interfaces (e.g., input/output iterators) that read and write from tables stored in the database 112. The advancement of the read/write operation may occur in the base operation that executes a partition execution loop. A partition execution loop may refer to herein code that is executed in a loop fashion so that each tuple in a table is processed. The base operation may call a specialized operation defined by the SUDF to perform an operation on current data (tuples pointed to by the current read/write interfaces) from the tables stored in the database 112. The SUDF may take the form of executable codes, such as compiled code or a Java object.

Example operational aspects of a computer device are now discussed in greater detail.

Figure 2:
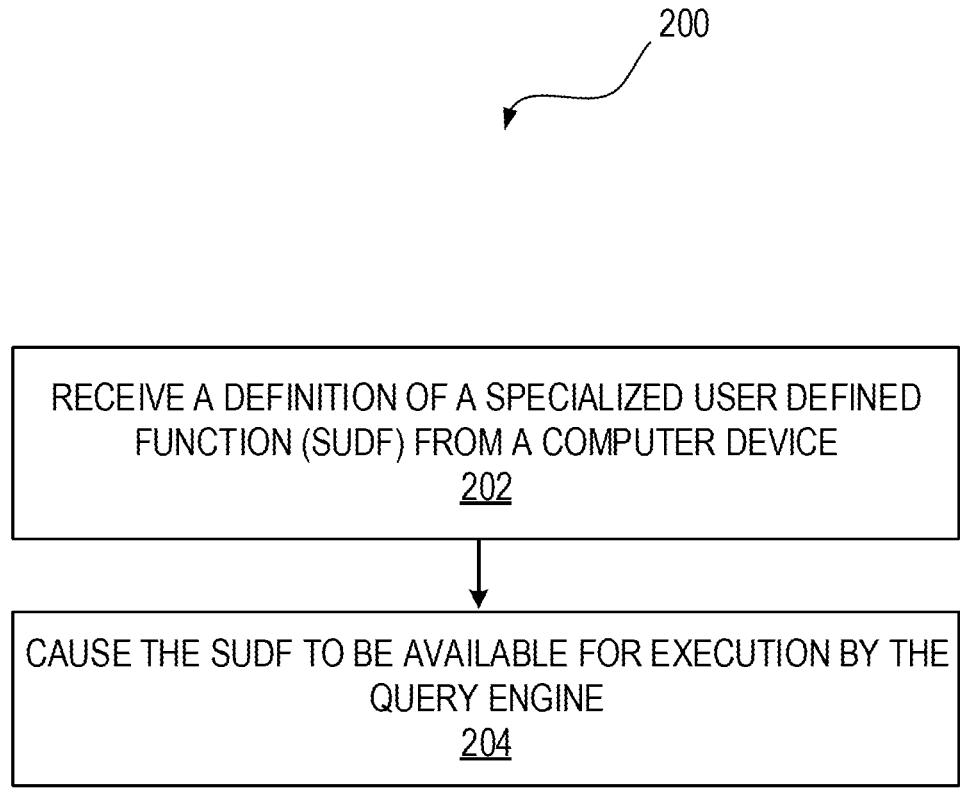
FIG. 2 is a flowchart illustrating a method for loading a specialized user defined function within a base user defined function enabled database management system, according to an example.

FIG. 2 is a flowchart illustrating a method 200 for loading a SUDF within a BUDF enabled database management system, according to an example. The method 200 may be performed by the modules, components, systems shown in FIG. 1, and, accordingly, is described herein merely by way of reference thereto. For example, in some cases, the method 200 may be performed by a BUDF enabled database management system or, more precisely, in some cases, a UDF manager. It will be appreciated that the method 200 may, however, be performed on any suitable hardware.

The method 200 may begin when, at block 202, the UDF manager may receive a definition of a SUDF from a computer device. The SUDF may specialize a BUDF that includes: (a) a base operation that handles interactions with an API of a query engine of a database management system; and (b) a call to a specialized operation defined by the definition of the SUDF. The specialized operation may include instructions for processing a tuple according to an analytics function. Further, the specialized operation may include instructions for returning a result to the base operation.

At block, 204, the UDF manager may cause the SUDF to be available for execution by the query engine. In some cases, making the SUDF available to the query engine may involve a factory class (or instance thereof). For example, a specialized factory class may be defined that implements a loading operation that tells the query engine the name assigned to the SUDF (e.g., a class name) and the parameters and return values for the processing operation of the SUDF.

Once the UDF manager causes the SUDF to be available for execution, the query engine may then execute the SUDF when a corresponding query request is received. A corresponding query request may refer to a query request that includes a relational operator, for example, that references the SUDF.

Figure 3:
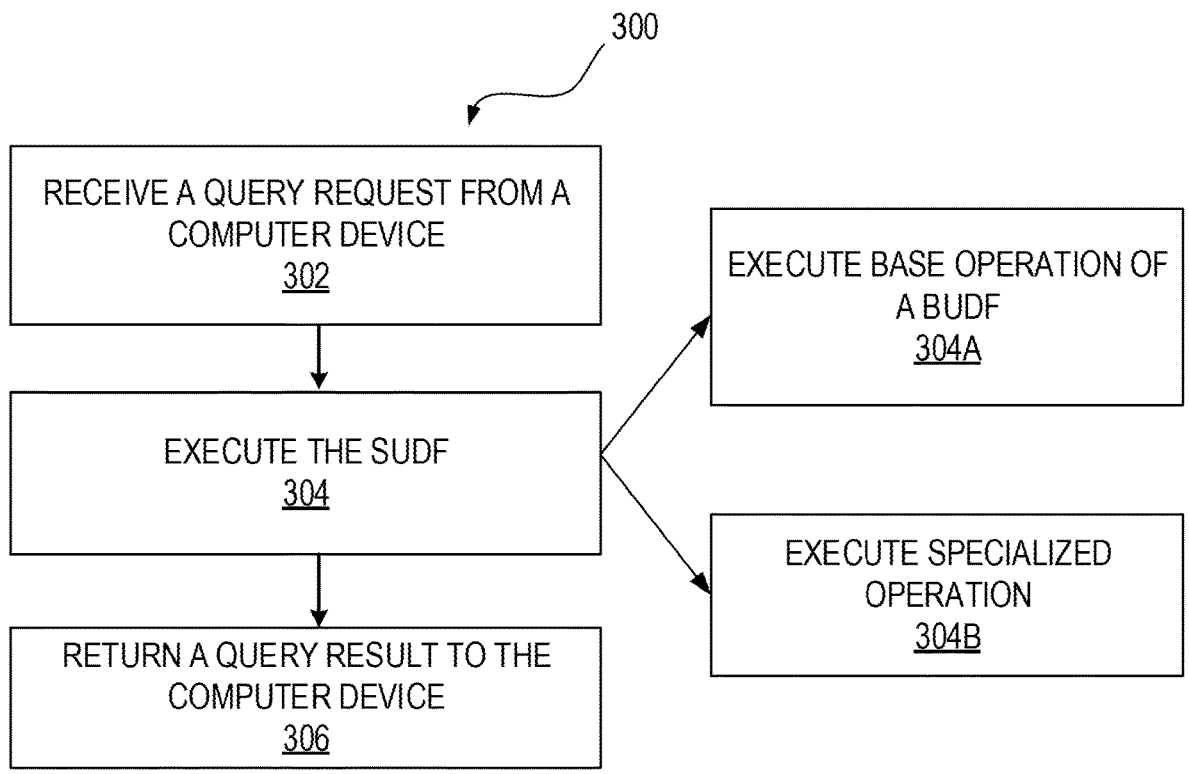
FIG. 3 is a flowchart illustrating executing of a specialized user defined function, according to an example.

FIG. 3 is a flowchart illustrating executing of a SUDF, according to an example. The method 300 may be performed by the modules, components, systems shown in FIG. 1, and, accordingly, is described herein merely by way of reference thereto. For example, in some cases, the method 300 may be performed by a BUDF enabled database management system or, more precisely, in some cases, a query engine. It will be appreciated that the method 300 may, however, be performed on any suitable hardware.

The method 300 may begin at block 302 when the query engine receives a query request from a computer device (e.g., a querying machine, such as the querying machine 104 of FIG. 1). The query request may include a query operator representing a SUDF. For example, the query request may be in the form of a SQL request, where the SUDF is a query operator within the SQL request.

At block 304, the query engine may execute the SUDF. In one case, in executing the SUDF, the query engine may execute a base operation of a BUDF that interacts with an API of the query engine to obtain a tuple stored in the database (block 304A). Additionally or alternatively, in executing the SUDF, the query engine may execute a specialized operation that processes the tuple according to an analytics function (block 304B). The specialized operation being defined by a sub-class of the base user defined function, and the specialized operation may generate a result.

At block 306, the query engine may return a query result to the computer device. The query result may include the result generated by the specialized operation.

In some cases, the use of a BUDF makes developing and wrapping UDFs easier. Such may be the case because the explicit code needed to interact with the query engine is replaced with declarative statements. That is, the BUDF and factory classes can be used to generate the function signature automatically from a developer's specification, and the BUDF can provide the code to cover the system interactions (e.g. read input/write output).

A BUDF can be reused for multiple SUDFs. For example, a SUDF that performs a first type of analytic operation may specialize the BUDF and another SUDF that performs a second type of analytic operation may likewise specialize the BUDF. In addition, a set of platform specific BUDFs may be provided such that the platform specific BUDF include logic to interact with different database platforms, such as a Graph DB or HDFS. In this way a UDF hierarchy can be formed, and by inheriting from the prebuilt BUDFs, the development of a specific SUDF can be greatly simplified.

Figure 4:
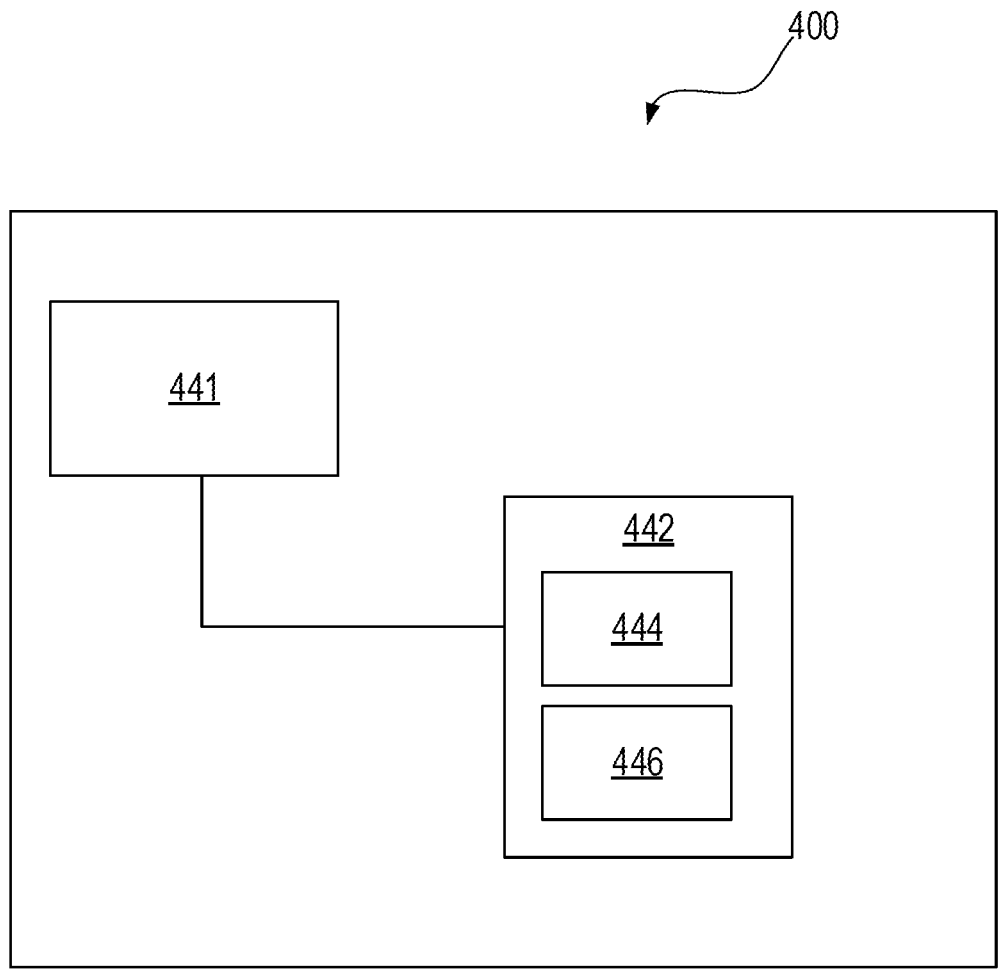
FIG. 4 is a block diagram illustrating a computer device, in accordance with an example

FIG. 4 is a block diagram illustrating a computer device 400, in accordance with an example. The computer device 400 may include a processor 441 and a computer-readable storage device 442. The processor 441 may be a device suitable to read and execute processor executable instructions, such as a CPU, or an integrated circuit configured to perform a configured function. The processor executable instructions may cause the processor 441 to implement techniques described herein. For example the processor 441 may execute instructions for enabling a BUDF in a database management system. For example, the processor may receive a definition of a SUDF from a computer device. The SUDF may specialize a BUDF that includes: (a) a base operation includes a processing block that advances a read iterator to a database table, and a call to a specialized operation defined by the definition of the SUDF. The specialized operation processes a tuple according to an analytics function and returns a result to the base operation. The processor is also to expose the SUDF as an executable operator for the query engine The processor 441 shown in FIG. 4 is coupled to the computer-readable storage device 442. The computer-readable storage device 442 may contain thereon a set of instructions, which when executed by the processor 441, cause the processor 441 to execute the techniques described herein. For example, the computer-readable storage device 442 may include SUDF executable instructions 444. Further, the computer-readable storage device 442 may include a SUDF object 446. The SUDF object 446 may be data and/or logic that is usable to execute a SUDF.

For example, in one aspect, execution of the instructions 444, whole or in part, may cause the processor 441 to receive a definition of a specialized user defined function (SUDF) (e.g., the SUDF object 446) from a computer device. The SUDF may specialize a base user defined function (BUDF). The BUDF can include: (a) a base operation that handles interactions with an application programming interface (API) of a query engine of a database management system, and (b) a call to a specialized operation defined by the definition of the SUDF. The specialized operation processes a tuple according to an analytics function and returns a result to the base operation. Execution of the instructions can further cause processor to cause the SUDF to be available for execution by the query engine.

What is claimed is:

1. A method comprising:
receiving, by at least one processor, a query request from a computer device, wherein the query request includes a query operator representing a specialized user defined function (SUDF) that specializes a base user defined function (BUDF), the BUDF comprises a base class definition, the base class definition defines a given function to be overridden by a subclass of the base class definition, and the SUDF corresponds to the subclass and overrides the given function;
executing, by the at least one processor, the SUDF, wherein executing the SUDF comprises:
executing a base operation of the BUDF that interacts with an application programming interface (API) of a query engine to obtain a tuple stored in a database;
executing a specialized operation that processes the tuple according to an analytics function, the specialized operation being defined by the SUDF, the specialized operation generating a result; and
returning, by the at least one processor, a query result to the computer device, the query result including the result.

2. The method of claim 1, wherein the base operation obtains the tuple stored in the database through a read interface.

3. The method of claim 2, wherein the base operation calls the specialized operation in a partition execution loop that advances the read interface at each iteration of the partition execution loop.

4. The method of claim 1, wherein the BUDF connects to a given database platform.

5. The method of claim 1, wherein the SUDF is a Java executable object.

6. A device comprising:
a processor; and
a machine-readable storage device comprising instructions that, when executed, cause the processor to:
receive a definition of a specialized user defined function (SUDF) from a computer device, wherein:
the SUDF specializes a base user defined function (BUDF) that includes: a base operation that includes a processing block that advances a read iterator to a database table, and a call to a specialized operation defined by the definition of the SUDF using a tuple pointed to by the read iterator,
the specialized operation processes the tuple according to an analytics function and returns a result to the base operation,
the BUDF comprises a base class definition,
the base class definition defines a given function to be overridden by a subclass of the base class definition, and
the SUDF corresponds to the subclass and overrides the given function; and
expose the SUDF as an executable operator for a query engine.

7. The device of claim 6, wherein the base operation obtains the tuple stored in the database table through a read interface.

8. The device of claim 7, wherein the base operation calls the specialized operation in a partition execution loop that advances the read interface at each iteration of the partition execution loop.

9. The device of claim 7, wherein the BUDF includes an API call to connect to a given database platform.

10. The device of claim 6, wherein the SUDF is an executable Java object.

11. A non-transitory machine-readable storage device comprising instructions that, when executed by a processor, cause the processor to:
receive a definition of a specialized user defined function (SUDF) from a computer device, wherein:
the SUDF specializes a base user defined function (BUDF) that includes: a base operation that handles interactions with an application programming interface (API) of a query engine of a database management system, and a call to a specialized operation defined by the definition of the SUDF,
the specialized operation processes a tuple according to an analytics function and returns a result to the base operation,
the BUDF comprises a base class definition,
the base class definition defines a method to be overridden by a subclass of the base class definition, and
the SUDF corresponds to the subclass and overrides the method; and
cause the SUDF to be available for execution by the query engine.

12. The non-transitory machine-readable storage device of claim 11, wherein, the instructions, when executed by the processor, further cause the tuple to be passed to the specialized operation via the base operation.

13. The non-transitory machine-readable storage device of claim 11, wherein the SUDF is a Java executable object.

14. The non-transitory machine-readable storage device of claim 11, wherein the BUDF declares the special operation and the SUDF overrides the special operation with a first analytic function.

15. The non-transitory machine-readable storage device of claim 14, wherein the instructions that, when executed by the processor, further cause the processor to:
receive an additional definition of an additional SUDF from the computer device, wherein the additional SUDF specializes the BUDF, and the additional SUDF overrides the specialized operation declared by the BUDF with a second analytic function.

16. The method of claim 1, wherein the given function comprises an object oriented programming method.

17. The device of claim 6, wherein the given function comprises an object oriented programming method.

18. The non-transitory machine-readable storage device of claim 11, wherein the method comprises an object oriented programming method.

* * * * *